United States Patent
Ryan et al.

(10) Patent No.: US 8,964,328 B1
(45) Date of Patent: Feb. 24, 2015

(54) SHOCK SENSOR ON AN EXTERNAL SURFACE OF A DISK DRIVE BASE ADJACENT A DISK DRIVE PRINTED CIRCUIT BOARD

(71) Applicant: Western Digital Technologies, Inc., Irvine, CA (US)

(72) Inventors: Robert P. Ryan, Mission Viejo, CA (US); John E. Scura, Paso Robles, CA (US); Erik J. Eklund, Costa Mesa, CA (US); May C. Kung, San Jose, CA (US); Albert J. Guerini, Gilroy, CA (US); Michael K. Liebman, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/968,344

(22) Filed: Aug. 15, 2013

Related U.S. Application Data

(60) Provisional application No. 61/837,599, filed on Jun. 20, 2013.

(51) Int. Cl.
  *G11B 33/08* (2006.01)
  *G11B 33/10* (2006.01)
  *G11B 5/596* (2006.01)

(52) U.S. Cl.
  CPC .................................. *G11B 5/59694* (2013.01)
  USPC ..................................... 360/97.12; 360/97.19

(58) Field of Classification Search
  USPC ................................. 360/97.11, 97.12, 97.19
  See application file for complete search history.

(56) References Cited

U.S. PATENT DOCUMENTS

| | | | |
|---|---|---|---|
| 4,040,103 A | 8/1977 | White | |
| 4,862,298 A | 8/1989 | Genheimer et al. | |
| 5,521,772 A * | 5/1996 | Lee et al. | 360/75 |
| 5,663,847 A | 9/1997 | Abramovitch | |
| 6,417,979 B1 | 7/2002 | Patton, III et al. | |
| 6,496,320 B1 | 12/2002 | Liu | |
| 6,674,600 B1 * | 1/2004 | Codilian et al. | 360/75 |
| 7,499,243 B2 | 3/2009 | Hirano et al. | |
| 7,551,389 B2 | 6/2009 | Tsuda et al. | |

(Continued)

FOREIGN PATENT DOCUMENTS

EP 0332317 A2 9/1989

OTHER PUBLICATIONS

Western Digital,"Rotary Acceleration Feed Forward (RAFF) Rotational Vibration Cancellation Technology in WD Raptor Serial ATA Hard Drives", Jan. 2004, 3 pages.

(Continued)

*Primary Examiner* — Jefferson Evans

(57) ABSTRACT

A disk drive includes a disk drive base, a disk drive top cover, and a head actuator pivotably attached to the disk drive base. The disk drive base and the disk drive top cover together form a disk drive enclosure that encloses the head actuator. At least one read head is attached to the head actuator. A disk drive printed circuit board (PCB) is attached to the disk drive base outside the disk drive enclosure. A motion sensor is attached to the disk drive base outside the disk drive enclosure. The motion sensor is disposed between the disk drive PCB and the disk drive base. The first motion sensor is electrically connected to the disk drive PCB by a plurality of resilient conductive prongs that are preloaded between the disk drive PCB and the first motion sensor.

21 Claims, 4 Drawing Sheets

(56) References Cited

U.S. PATENT DOCUMENTS

| | | |
|---|---|---|
| 7,679,865 B2 | 3/2010 | Shoji |
| 7,768,738 B2 | 8/2010 | Abramovitch et al. |
| 2007/0188909 A1* | 8/2007 | Hutsell et al. ............. 360/77.08 |
| 2007/0291400 A1* | 12/2007 | Chang ........................... 360/75 |
| 2010/0193923 A1* | 8/2010 | Tanaka et al. ................ 257/676 |

OTHER PUBLICATIONS

Western Digital, Rotary Acceleration Feed Forward (RAFF) Information Sheet, Apr. 2012, 2 pages.

SFF Committee, "SFF-8201 Specification for Form Factor of 2.5" Disk Drives", Rev 3.1, Jul. 8, 2013, 12 pages.

* cited by examiner

SHOCK SENSOR ON AN EXTERNAL SURFACE OF A DISK DRIVE BASE ADJACENT A DISK DRIVE PRINTED CIRCUIT BOARD

CROSS-REFERENCE TO RELATED APPLICATIONS

This application claims priority to provisional U.S. Patent Application Ser. No. 61/837,599, filed on Jun. 20, 2012, which is hereby incorporated by reference in its entirety.

BACKGROUND

Shock and/or vibration sensors have been mounted on disk drive printed circuit boards (PCBs), and have been used to help prevent mechanical disturbances from causing a write in progress to stray excessively off track and destroy previously written data on adjacent tracks. The vibration and shock sensors have been mounted on the PCBs because of a substantial advantage in ease of assembly.

Piezo electric transducers that are used as shock or vibration sensors have been mounted on the disk drive PCB at an angle, so as to have some sensitivity to shock and/or vibration x, y, and z components. In theory the shock sensor is blind (i.e. zero sensitivity) in one axis, but because practical shocks cause multiple modes of vibration response, the sensitivity is practically never zero.

However, as track density increases (i.e. the spacing between concentric data tracks written on the disk decreases), the requirements for sensor speed (quicker response) and sensitivity increase.

Disk drive PCBs typically include capacitors, and ceramic capacitor technology has compressed capacitance into thinner smaller packages. However, the ceramic capacitors induce more vibration on the PCB. Vibration reduced ceramic capacitors are being offered but are undesirably larger for the same capacitance.

Hence, there is a need in the art for more sensitive and quicker responding shock and vibration sensing in disk drive applications.

DETAILED DESCRIPTION OF EXEMPLARY EMBODIMENTS

Figure 1:
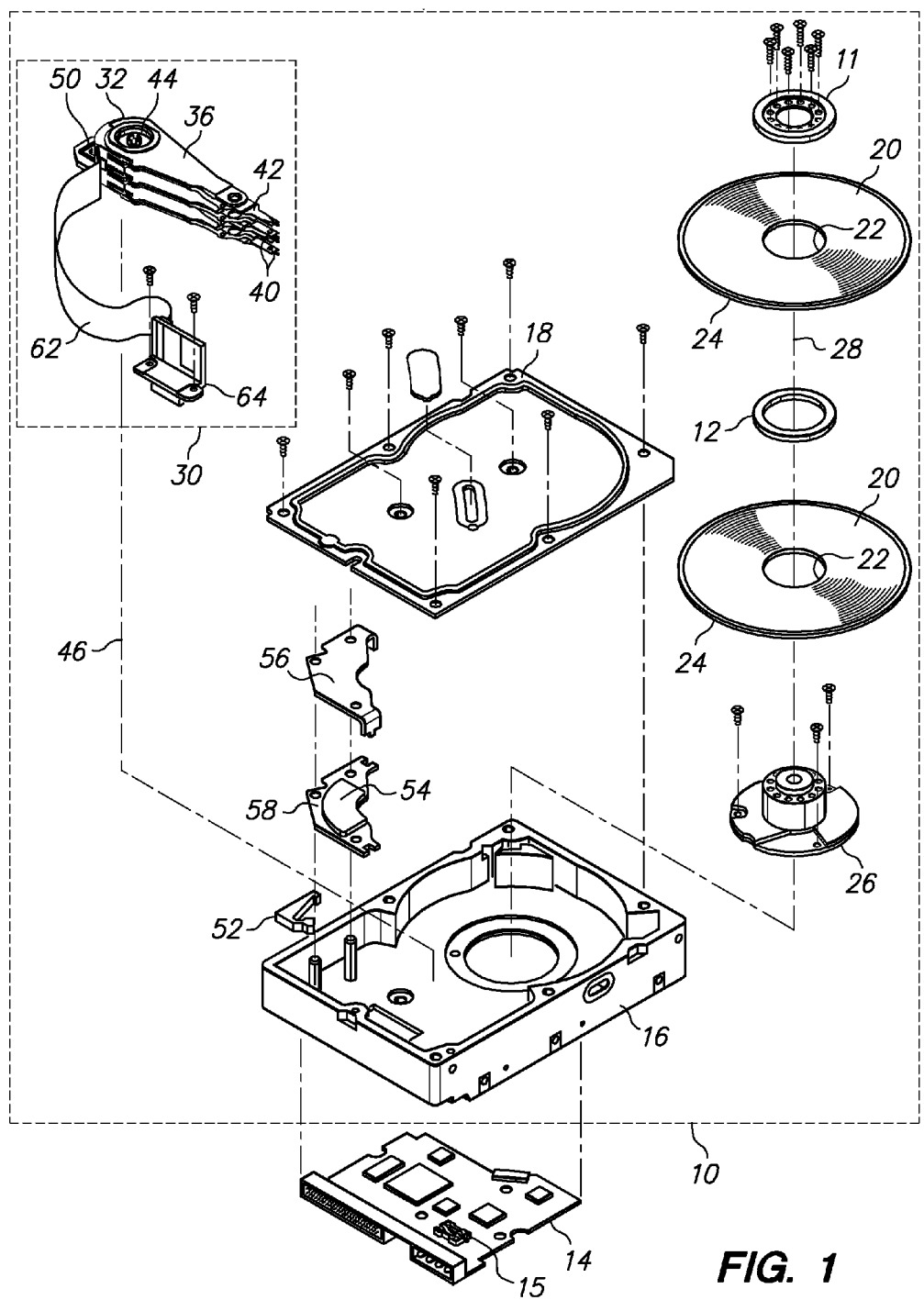
FIG. 1 is an exploded view of a disk drive according to an embodiment of the present invention.

FIG. 1 is an exploded perspective view of a disk drive according to an embodiment of the present invention. The disk drive includes a head disk assembly (HDA) 10 and a printed circuit board assembly (PCB) 14. The HDA 10 includes a disk drive base 16 (e.g. aluminum base casting) and a disk drive cover 18 (e.g. stamped aluminum sheet metal cover) that together form a disk drive enclosure that houses at least one annular magnetic disk 20. In FIG. 1, a plurality of conventional screw fasteners is shown to be attached the disk drive cover 18 to the disk drive base 16. In the embodiment of FIG. 1, the PCB 14 is likewise attached to the disk drive base 16, outside of the enclosure formed by the disk drive base 16 and the disk drive cover 18.

In the embodiment of FIG. 1, each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

In certain embodiments, the HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore and a pivot bearing cartridge 44 engaged within the bore for facilitating the HSA 30 to rotate relative to HDA 10 about actuator pivot axis 46. One or two head gimbal assemblies (HGA) 42 are attached to a distal end of each actuator arm 36. The disk drive enclosure formed by the disk drive base 16 and the disk drive top cover 18 encloses the HSA 30 and its actuator body 32 and actuator arms 36.

In certain embodiments, each HGA 42 includes a read head (e.g. read head 40) for reading and writing data from and to the disk 20, and a load beam to compliantly preload the head against the disk 20. Note that any head that can read is referred to as a "read head" herein, even if it also performs other functions and/or has other structures such as a writer, a heater, a laser, a microactuator, etc.

In the embodiment of FIG. 1, the read head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of read head 40, and a surface of the magnetic disk 20. The thickness of the air bearing at the location of the transducer is commonly referred to as "flying height."

In the example of FIG. 1, the HSA 30 further includes a coil support that extends from one side of the HSA 30 that is opposite read head 40. The coil support is configured to support a coil 50 through which a controlled electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

In certain embodiments, the PCB 14 includes a servo control system for generating servo control signals to control the current through the coil 50 and thereby position the HSA 30 relative to tracks disposed upon surfaces of disk 20. In certain embodiments, the HSA 30 is electrically connected to PCB 14 via an actuator flexible printed circuit (FPC), which includes a flex cable 62 and a flex cable support bracket 64. The flex cable 62 supplies current to the coil 50 and carries signals between the HSA 30 and the PCB 14. In the embodiment of FIG. 1, the PCB 14 also includes a motion sensor connector 15 that connects to a motion sensor that is attached to the disk drive base 16, as described in more detail with reference to subsequent examples given in this specification.

Figure 2:
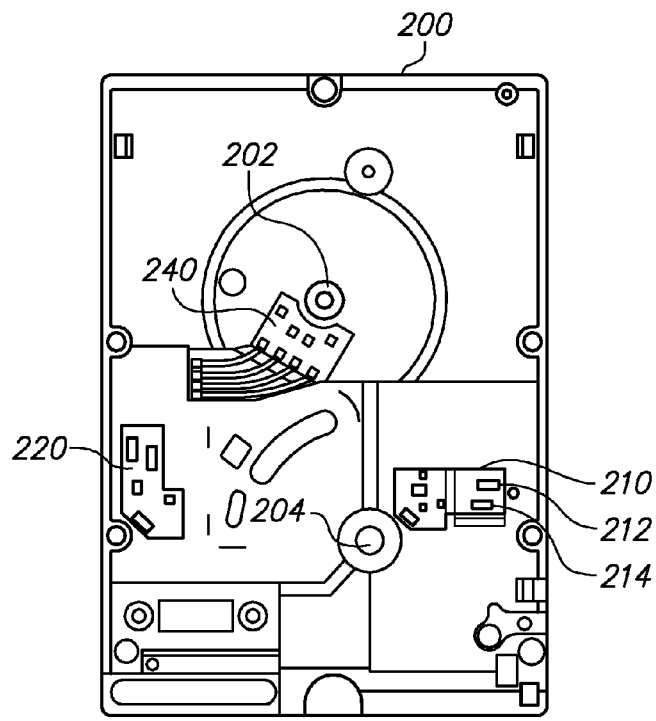
FIG. 2 is a bottom view of a disk drive base according to an embodiment of the present invention.

FIG. 2 is a bottom view of a disk drive base 200 according to an embodiment of the present invention. The disk drive base 200 includes a disk spindle attachment location 202, and a head actuator attachment location 204 where a head actuator is pivotably attached to the disk drive base 200 within the disk drive enclosure. In the embodiment of FIG. 2, a spindle flexible printed circuit 240, and a motion sensor 210, are attached (e.g. adhered by an adhesive bond) to the disk drive base 200 outside the disk drive enclosure. The motion sensor 210 includes a small local printed circuit having conductive terminals 212, 214. An optional second motion sensor 220 may also be adhered to the disk drive base 200 outside the disk drive enclosure.

In disk drive products of "3.5 inch form factor" (disk drives that are approximately 101.6 mm wide and 146 mm long), the motion sensor 210 is preferably but not necessarily attached to the disk drive base 200 no more than 25 mm from the actuator attachment location 204. In disk drive products of "2.5 inch form factor" (disk drives that are approximately 69.85 mm wide and 100 mm long), the motion sensor 210 is preferably but not necessarily attached to the disk drive base 200 no more than 20 mm from the actuator attachment location 204. In certain embodiments, such proximity may be preferable to enhance the speed and correlation of the response of the motion sensor to mechanical shocks and vibrations that affect the head actuator, which in certain embodiments can be the most important class of mechanical shocks and vibrations.

In the embodiment of FIG. 2, the motion sensor 210 may be one or more piezoelectric transducers that are used as a shock or vibration sensor. For example, the motion sensor 210 may include a mass attached to a piezoelectric material such as lead zirconate titanate, lead titanate, barium titanate, etc. In this way, an acceleration of the disk drive base 200 will cause strain in the piezoelectric material that can be sensed as a voltage. Such a sensor may be referred to as being a piezoelectric accelerometer.

Figure 3:
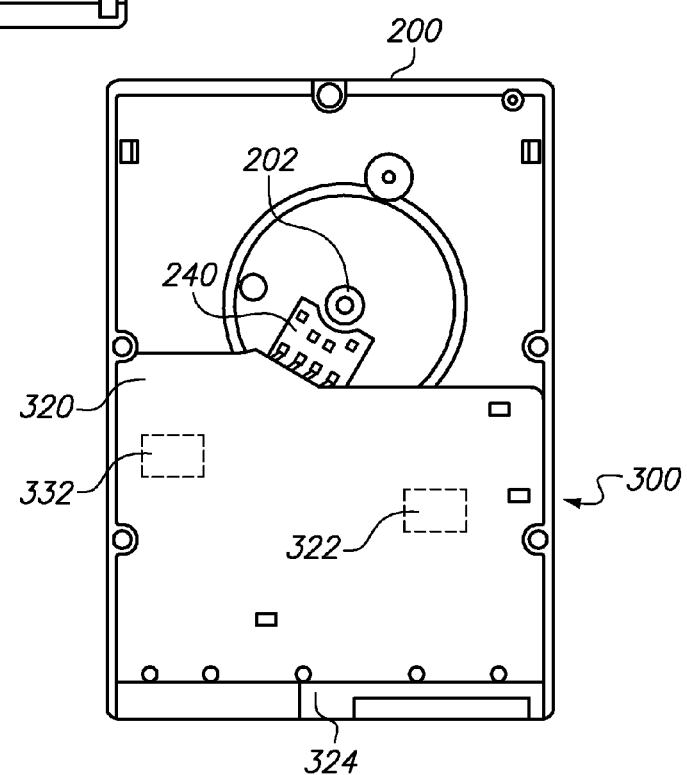
FIG. 3 is a bottom view of a disk drive, according to an embodiment of the present invention.

FIG. 3 depicts a disk drive 300 assembled from the disk drive base 200. The disk drive 300 includes a disk drive printed circuit assembly (PCB) 320 that includes a host connector 324 and a motion sensor connector 322. The host connector may be a conventional and standard SATA, IDE, or SCSI connector, for example. The disk drive PCB 320 may optionally include a second motion sensor connector 332. The motion sensor connectors 322, 332 are shown in phantom (dashed) lines, because they are disposed on the opposite side of the PCB 320 than the side that faces the viewer of FIG. 3. Note that in FIG. 3, the motion sensors 210, 220 cannot be seen because they are disposed between the disk drive PCB 320 and the disk drive base 200, and therefore the disk drive PCB 320 obscures them (in the view of FIG. 3).

Figure 4:
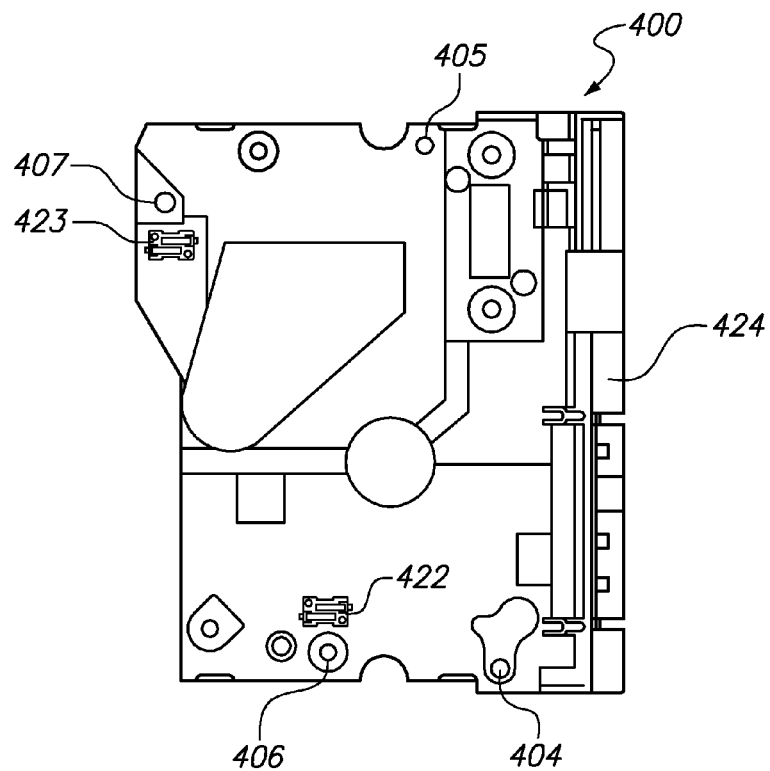
FIG. 4 depicts a disk drive printed circuit board, according to an embodiment of the present invention.

FIG. 4 depicts a disk drive printed circuit board (PCB) 400, according to an embodiment of the present invention. The disk drive PCB 400 includes a plurality of mounting holes 404, 405, 406, 407 that can accept fasteners (e.g. conventional screw fasteners) to fasten the disk drive PCB 400 to a disk drive base. The disk drive PCB 400 also includes a host connector 424 and two motion sensor connectors 422, 423. The host connector may be a conventional and standard SATA, IDE, or SCSI connector, for example.

In certain embodiments, each of the motion sensor connectors 422, 423 is preferably but not necessarily disposed no more than 10 mm from at least one of the plurality of mounting holes. For example, in the embodiment of FIG. 4, the motion sensor connector 422 is preferably but not necessarily disposed no more than 10 mm from the mounting hole 406, and the motion sensor connector 423 is preferably but not necessarily disposed no more than 10 mm from the mounting hole 407. Consequently, it follows that in such embodiments, the corresponding motion sensors would be attached to the disk drive base no more than 10 mm from at least one of the plurality of conventional screw fasteners. In certain embodiments, such proximity of the motion sensor connectors 422, 423 to PCB fastening locations may enhance the reliability of the electrical connections to the motion sensors, by limiting out-of-plane flexing of the disk drive PCB 400 at the locations of the motion sensor connectors 422, 423.

Figure 5:
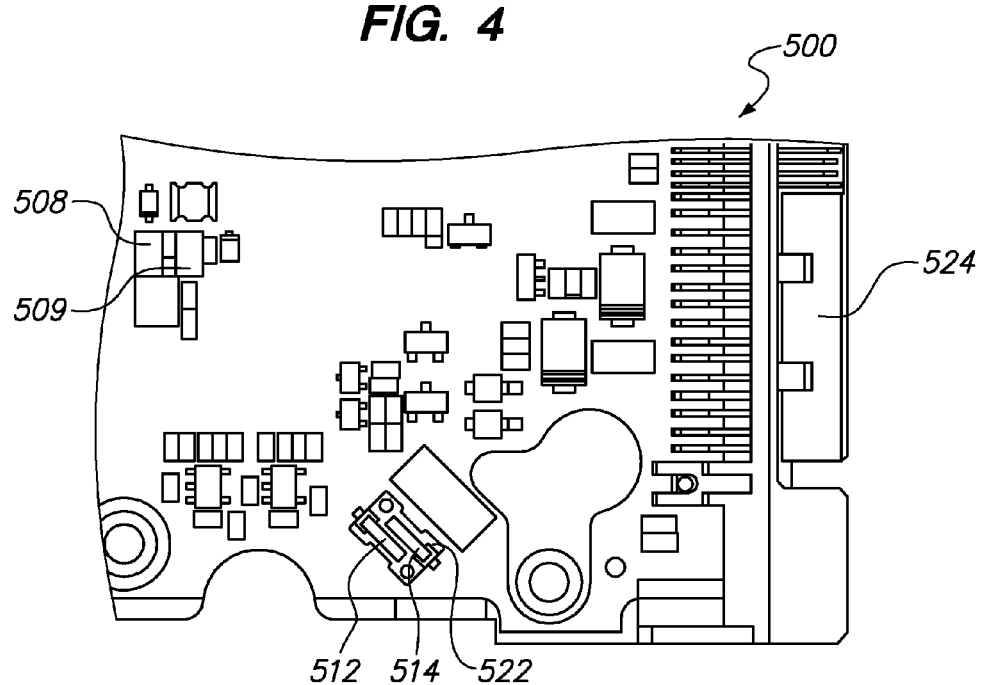
FIG. 5 depicts a disk drive printed circuit board, according to another embodiment of the present invention.

FIG. 5 depicts a disk drive printed circuit board (PCB) 500, according to another embodiment of the present invention. The disk drive PCB 500 includes a host connector 524 and a motion sensor connector 522. The host connector may be a conventional and standard SATA, IDE, or SCSI connector, for example. In the embodiment of FIG. 5, the disk drive PCB 500 is also depicted to include a variety of conventional circuit components, for example including ceramic capacitors 508, 509. The motion sensor connector 522 of the disk drive PCB 500 includes two resilient conductive prongs 512, 514, that are intended to be preloaded against conductive terminals of a corresponding motion sensor (e.g. which motion sensor would be attached to a disk drive base as shown with reference to previous figures), to establish electrical connections with such motion sensor.

According to certain embodiments, the aforementioned electrical connections may be established during disk drive assembly by attaching the disk drive PCB 500 to the disk drive base outside the disk drive enclosure so as to overlie the motion sensor, after the first motion sensor is adhered to the disk drive base. Because the motion sensor is disposed between the disk drive PCB 500 and the disk drive base, fixing the disk drive PCB 500 to the disk drive base may also serve to preload the resilient conductive prongs 512, 514 against conductive terminals of the corresponding motion sensor (to establish electrical connections with the motion sensor).

Figure 6:
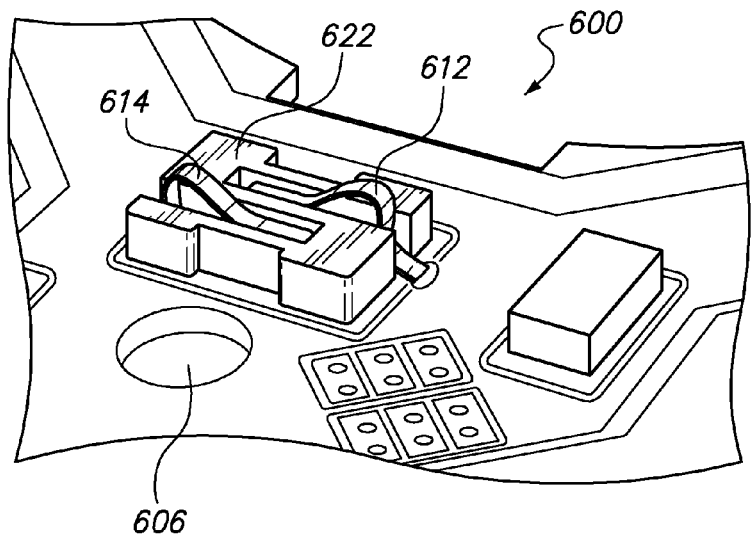
FIG. 6 depicts a portion of a disk drive printed circuit board, according to an embodiment of the present invention.

FIG. 6 depicts a portion of a disk drive printed circuit board (PCB) 600, according to an embodiment of the present invention. The disk drive PCB 600 includes a motion sensor connector 622 that has two resilient conductive prongs 612, 614 that are intended to be preloaded against corresponding conductive terminals of a corresponding motion sensor (e.g. motion sensor 210 that is attached to the disk drive base 200 in FIG. 2), to establish electrical connections with such motion sensor. However, in certain alternative embodiments, the motion sensor connector 622 may include more than two resilient conductive prongs, for example to connect with a motion sensor that includes more than one motion sensing element. The resilient conductive prongs 612, 614 may include an optional gold coating, for example to enhance the conductivity and/or reliability of electrical connections made by contact with surfaces of the resilient conductive prongs 612, 614.

In the embodiment of FIG. 6, the motion sensor connector 622 is preferably but not necessarily disposed no more than 10 mm from a PCB mounting hole 606. Hence, after disk drive assembly, the corresponding motion sensor (attached to the disk drive base) would be disposed no more than 10 mm from one of the fasteners that attaches the disk drive PCB to the disk drive base. In certain embodiments, such proximity of the motion sensor connector 622 to a PCB fastening location may enhance the reliability of the electrical connection to the corresponding motion sensor, by limiting out-of-plane flexing of the disk drive PCB 600 at the location of the motion sensor connector 622.

Figures 7A, 7B, 8:
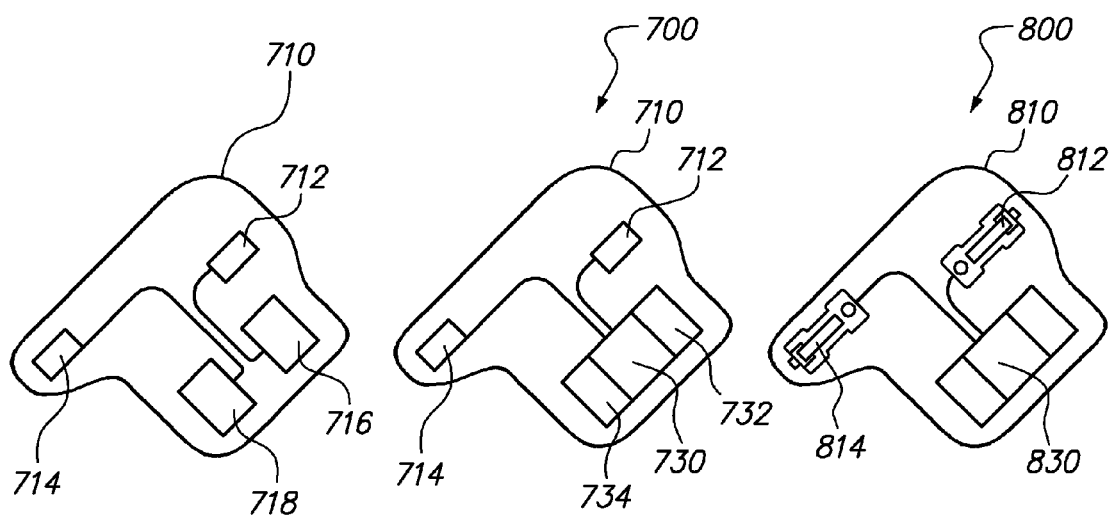
FIG. 7A depicts a motion sensor flexible printed circuit, according to an embodiment of the present invention.
FIG. 7B depicts a motion sensor according to an embodiment of the present invention.
FIG. 8 depicts a motion sensor according to an embodiment of the present invention.

In certain embodiments, the conductive terminals of the motion sensor may be integral with the piezoelectric transducer. In certain alternative embodiments, the conductive terminals of the motion sensor instead may be part of a local flexible circuit that is adhered to the disk drive base along with the piezoelectric transducer. For example, FIG. 7A depicts a motion sensor flexible printed circuit (FPC) 710, according to an embodiment of the present invention. The motion sensor FPC 710 is preferably but not necessarily adhered to a disk drive enclosure (e.g. the disk drive base) by a conventional adhesive bond. The motion sensor FPC 710 includes motion sensor conductive terminals 712, 714, leading to conductive pads 716, 718 upon which the motion sensor is attached.

In certain embodiments, the motion sensor FPC 710 optionally may be integral with, and/or attached to the disk drive base along with, an existing flex circuit for driving the spindle motor (e.g. spindle flexible printed circuit 240 of FIG. 2). For example, the motion sensor FPC 710 may optionally be a region that extends from the spindle flexible printed circuit (e.g. spindle flexible printed circuit 240 of FIG. 2). Reducing the size of the motion sensor FPC 710 may reduce its cost and improve its susceptibility to noise. In certain embodiments, an operational amplifier may be optionally added to the motion sensor FPC 710, for amplification and/or filtering where noise may otherwise be a concern.

FIG. 7B depicts a motion sensor 700 according to an embodiment of the present invention. The motion sensor 700 optionally includes the motion sensor FPC 710 and a motion sensing transducer 730. The motion sensing transducer 730 optionally includes transducer conductive terminals 732, 734. In the embodiment of FIG. 7B, the motion sensing transducer 730 may be one or more piezoelectric transducers that are used as a shock or vibration sensor. For example, the motion sensing transducer 730 may include a mass attached to a piezoelectric material. In this way, after the motion sensor 700 is attached to a disk drive enclosure, an acceleration of the disk drive enclosure will cause strain in the piezoelectric material that can be sensed by a circuit in the disk drive PCB that is connected to the motion sensor conductive terminals 712, 714. In certain alternative embodiments, the motion sensor 700 may include more than one sensing element, and may include more than two motion sensor conductive terminals.

Although FIG. 7B depicts the motion sensor 700 as including the motion sensor FPC 710, alternatively the motion sensor 700 may optionally not include the motion sensor FPC 710. In that case, the motion sensing transducer 730 may be adhered directly to the disk drive base (e.g. to disk drive base 200 of FIG. 2), and electrically connected via contact between the transducer conductive terminals 732, 734 and corresponding PCB resilient conductive prongs (e.g. resilient conductive prongs 612, 614 of FIG. 6).

FIG. 8 depicts a motion sensor 800 according to another embodiment of the present invention. The motion sensor 800 includes a motion sensor FPC 810 and a motion sensing transducer 830. In the embodiment of FIG. 8, the motion sensing transducer 830 may be one or more piezoelectric transducers that are used as a shock or vibration sensor. According to the embodiment of FIG. 8, the motion sensor 800 includes a plurality of resilient conductive prongs 812, 814 that, after disk drive assembly, extend towards and are preloaded against a disk drive PCB. Specifically, the resilient conductive prongs 812, 814 are, after disk drive assembly, preloaded against respective ones of a plurality disk drive PCB conductive terminals (e.g. like conductive terminals 712, 714 of FIG. 7B, except disposed on the disk drive PCB rather than on the motion sensor FPC 810), to establish electrical connections with the disk drive PCB.

Certain embodiments of the present invention provide an advantage of reduced propagation delay of disk drive shock and vibe events to the motion sensor, and therefore quicker motion sensor response, and enhanced isolation from disk drive PCB vibration induced by ceramic capacitors. In certain embodiments, spindle runout detection may also be improved, which may facilitate operation with lower cost spindle motors and/or cantilevered rotating shaft spindle motors.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base,
   a disk drive top cover;
   a head actuator pivotably attached to the disk drive base, the disk drive base and the disk drive top cover together forming a disk drive enclosure that encloses the head actuator;
   at least one read head attached to the head actuator;
   a disk drive printed circuit board (PCB) attached to the disk drive base outside the disk drive enclosure; and
   a first motion sensor adhered to an external surface of the disk drive base;
   wherein the first motion sensor is disposed between the disk drive PCB and the disk drive base, and wherein the first motion sensor is electrically connected to the disk drive PCB by a plurality of resilient conductive prongs that are preloaded between the disk drive PCB and the first motion sensor.

2. The disk drive of claim 1 wherein the first motion sensor includes a plurality of conductive terminals, and wherein the disk drive PCB includes the plurality of resilient conductive prongs that are preloaded against respective ones of the plurality conductive terminals to establish electrical connections with the first motion sensor.

3. The disk drive of claim 1 wherein the disk drive PCB includes a plurality of conductive terminals, and wherein the first motion sensor includes the plurality of resilient conductive prongs that are preloaded against respective ones of the plurality conductive terminals to establish electrical connections with the disk drive PCB.

4. The disk drive of claim 1 wherein the disk drive is a 3.5" form factor disk drive, and the head actuator is pivotably attached to the disk drive base at an actuator attachment location, and wherein the first motion sensor is attached to the disk drive base no more than 25 mm from the actuator attachment location.

5. The disk drive of claim 1 wherein the disk drive is a 2.5" form factor disk drive, and the head actuator is pivotably attached to the disk drive base at an actuator attachment location, and wherein the first motion sensor is attached to the disk drive base no more than 20 mm from the actuator attachment location.

6. The disk drive of claim 1 wherein the first motion sensor comprises at least one piezoelectric accelerometer.

7. The disk drive of claim 1 wherein the disk drive PCB is attached to the disk drive base by a plurality of screw fasteners, and wherein the first motion sensor is attached to the disk drive base no more than 10 mm from at least one of the plurality of screw fasteners.

8. The disk drive of claim 1 wherein the first motion sensor includes a mechanical shock sensor.

9. The disk drive of claim 1 wherein the first motion sensor includes a vibration sensor.

10. The disk drive of claim 1, further comprising a second motion sensor adhered to an external surface of the disk drive base outside the disk drive enclosure, the second motion sensor being disposed between the disk drive PCB and the disk drive base.

11. The disk drive of claim 1 wherein at least one of the plurality of resilient conductive prongs includes a gold coating.

12. The disk drive of claim 1 wherein the disk drive PCB includes at least one ceramic capacitor.

13. A disk drive comprising:
 a disk drive base,
 a disk drive top cover;
 a head actuator pivotably attached to the disk drive base, the disk drive base and the disk drive to cover together forming a disk drive enclosure that encloses the head actuator;
 at least one read head attached to the head actuator;
 a disk drive printed circuit board (PCB) attached to the disk drive base outside the disk drive enclosure; and
 a first motion sensor attached to the disk drive base outside the disk drive enclosure;
 wherein the first motion sensor is disposed between the disk drive PCB and the disk drive base, and wherein the first motion sensor is electrically connected to the disk drive PCB by a plurality of resilient conductive prongs that are preloaded between the disk drive PCB and the first motion sensor;
 wherein the first motion sensor includes a plurality of conductive terminals, wherein the disk drive PCB includes the plurality of resilient conductive prongs that are preloaded against respective ones of the plurality conductive terminals to establish electrical connections with the first motion sensor; and
 wherein the first motion sensor includes a first motion sensor flexible printed circuit, the plurality of conductive terminals being disposed on the first motion sensor flexible printed circuit.

14. The disk drive of claim 13 wherein the first motion sensor is attached to the disk drive base by an adhesive that bonds the first motion sensor flexible printed circuit to the disk drive base.

15. The disk drive of claim 13 further including a spindle rotatably attached to the disk drive base, and a disk mounted on the spindle, the disk being enclosed within the disk drive enclosure, the disk drive further including a spindle flexible printed circuit adhered to the disk drive base outside of the disk drive enclosure, wherein the first motion sensor flexible printed circuit extends from the spindle flexible printed circuit.

16. A method to assemble a disk drive, the method comprising:
 providing a head actuator that includes a read head;
 attaching the head actuator to a disk drive base at an actuator attachment location;
 attaching a disk drive cover to the disk drive base to form a disk drive enclosure that encloses the head actuator;
 adhering a first motion sensor to the disk drive base outside the disk drive enclosure;
 attaching a disk drive printed circuit board (PCB) to the disk drive base outside the disk drive enclosure so as to overlie the first motion sensor, after the first motion sensor is adhered to the disk drive base;
 wherein the first motion sensor is disposed between the disk drive PCB and the disk drive base, and wherein attaching the disk drive PCB to the disk drive base electrically connects the first motion sensor to the disk drive PCB by preloading a plurality of resilient conductive prongs between the first motion sensor and the disk drive PCB.

17. The method of claim 16 wherein the first motion sensor is adhered to the disk drive base no more than 25 mm from the actuator attachment location.

18. The method of claim 16, further comprising adhering a second motion sensor to the disk drive base outside the disk drive enclosure, before attaching the disk drive PCB to the disk drive base, the disk drive PCB overlying the second motion sensor after the disk drive PCB is attached to the disk drive base.

19. The method of claim 16 wherein at least one of the plurality of resilient conductive prongs includes a gold coating.

20. The method of claim 16 wherein first motion sensor includes a first motion sensor flexible printed circuit and wherein adhering a first motion sensor to the disk drive base comprises adhering the first motion sensor flexible printed circuit to the disk drive base.

21. The method of claim 16 wherein attaching a disk drive PCB to the disk drive base comprises fastening the disk drive PCB to the disk drive base by a plurality of screw fasteners, at least one of the plurality of screw fasteners being no more than 10 mm from the first motion sensor.

\* \* \* \* \*